(12) United States Patent
Pawlyk

(10) Patent No.: US 8,950,243 B2
(45) Date of Patent: Feb. 10, 2015

(54) METHOD OF TESTING FOR LEAKS IN A CONTAINED SYSTEM

(76) Inventor: Richard Allan Pawlyk, St. Albert (CA)

( * ) Notice: Subject to any disclaimer, the term of this patent is extended or adjusted under 35 U.S.C. 154(b) by 1041 days.

(21) Appl. No.: 12/873,150

(22) Filed: Aug. 31, 2010

(65) Prior Publication Data

US 2012/0048001 A1    Mar. 1, 2012

(51) Int. Cl.
     *G01M 3/04*      (2006.01)
     *G01M 3/22*      (2006.01)
     *G01M 3/20*      (2006.01)

(52) U.S. Cl.
     CPC ............... *G01M 3/22* (2013.01); *G01M 3/205* (2013.01)
     USPC ........................................................ 73/40.7

(58) Field of Classification Search
     USPC ............ 73/40.7, 40, 40.5 R, 49.1, 49.2, 49.3, 73/40.5 A
     See application file for complete search history.

(56) References Cited

U.S. PATENT DOCUMENTS

| | | | |
|---|---|---|---|
| 4,709,577 A | | 12/1987 | Thompson |
| 4,725,551 A | | 2/1988 | Thompson |
| 5,046,353 A | | 9/1991 | Thompson |
| 5,048,324 A | | 9/1991 | Thompson |
| 5,295,391 A | * | 3/1994 | Mastandrea et al. ........... 73/49.2 |
| 5,447,055 A | | 9/1995 | Thompson |
| 5,767,390 A | | 6/1998 | Chapman, IV |
| 5,922,943 A | * | 7/1999 | Chapman, IV ................. 73/40.7 |
| 6,530,264 B1 | * | 3/2003 | Rink et al. ...................... 73/40.7 |
| 7,178,385 B2 | | 2/2007 | McCoy |

FOREIGN PATENT DOCUMENTS

| | | |
|---|---|---|
| CA | 2 478 992 A1 | 9/2003 |
| WO | 2005/036100 A2 | 4/2005 |

OTHER PUBLICATIONS

Bryce, P.W., "LEOS Leak Detection and Location System," presented to the National Association of Regulatory Utility Commissioners (NARUC), Washington, D.C., Feb. 28, 2001, 28 pages.
"EX-TEC® SR5, SR4, SR2, VARIOTEC® 8, Operating Instructions," Hermann Sewerin GmbH, Gütersloh, Germany, <http://www.enermak.com/upload/mce_files/bea_sr5_4_2_vt_en_kehinweis.pdf>, Aug. 1999, 55 pages.
Hogg, R.S., "Storage-Tank Leak Detection Improved With Cable-Sensor System," Oil and Gas Journal 98(2):46-50, Jan. 2000.

* cited by examiner

*Primary Examiner* — Daniel S Larkin
*Assistant Examiner* — Jamar Ray
(74) *Attorney, Agent, or Firm* — Christensen O'Connor Johnson Kindness PLLC

(57) ABSTRACT

A method of testing for leaks in a contained system with an interior containing system gas and system liquid at an operating pressure, the method comprising: pressurizing the interior of the contained system, by introduction of gas comprising tracer gas into the interior, to at least 0.5 pounds per square inch above the operating pressure to disperse the tracer gas throughout the system liquid; and sensing for the presence of the tracer gas using one or more sensors located outside the contained system.

14 Claims, 4 Drawing Sheets

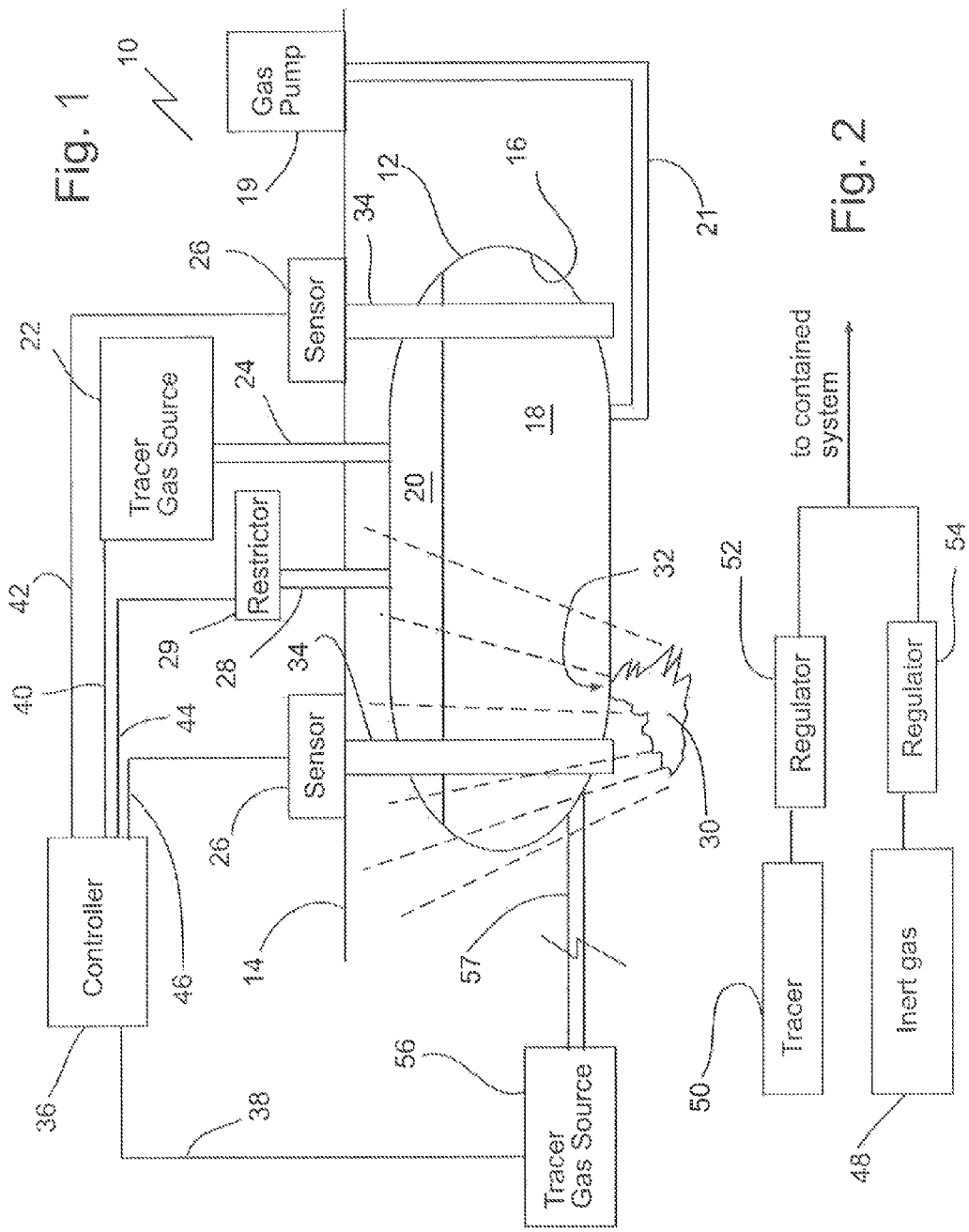

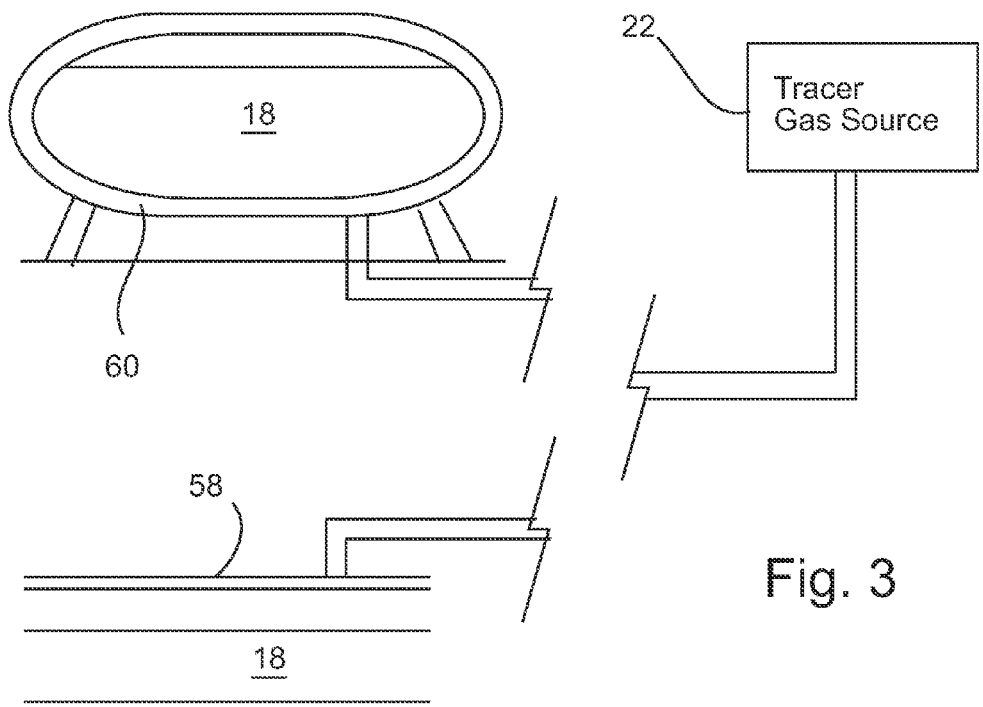

Fig. 3

100
Pressurizing the interior of the contained system, by introduction of gas comprising tracer gas into the interior, to at least 0.5 pounds per square inch above the operating pressure to disperse the tracer gas above a threshold concentration throughout the system liquid.

102
Sensing for the presence of tracer gas using one or more sensors located outside the contained system.

Fig. 4

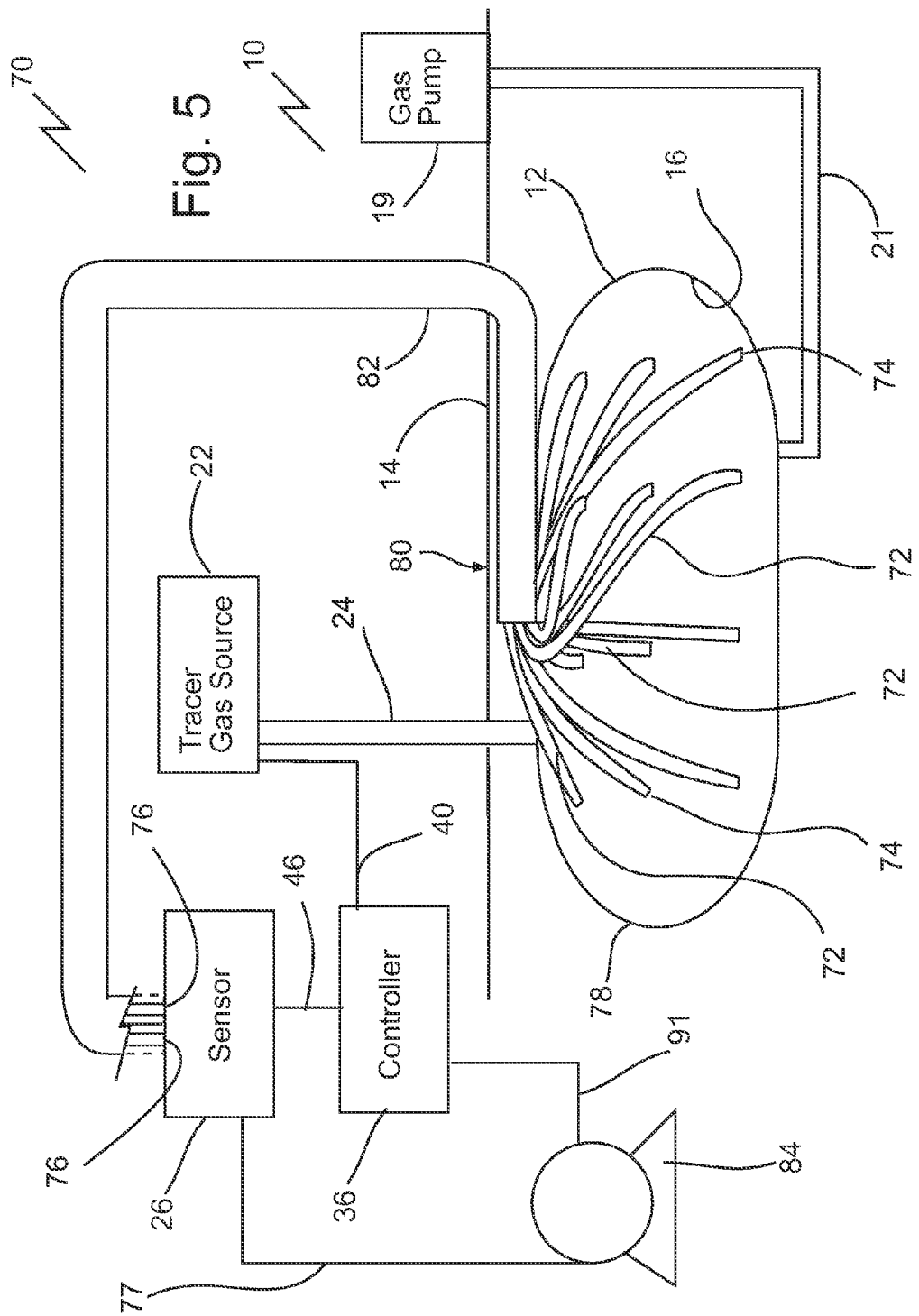

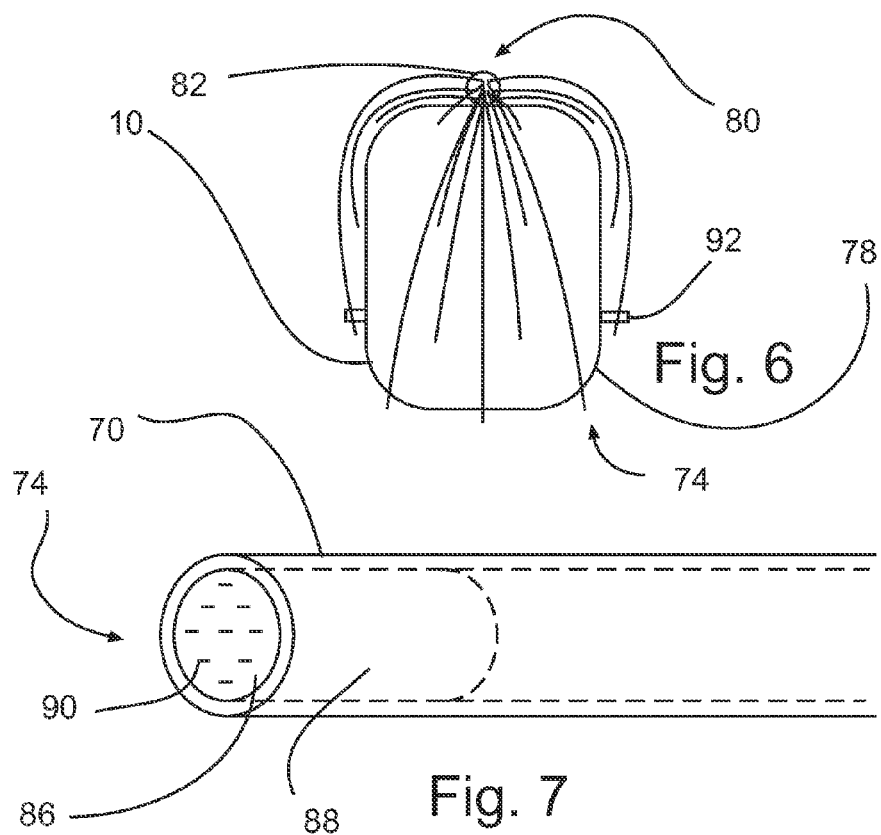

| 104 |
|---|
| Drawing fluids into respective sampling inlets of a plurality of tubes, the sampling inlets being positioned at different predetermined locations about an exterior of the contained system. |

| 106 |
|---|
| Sensing for the presence of the unique fluid species using one or more sensors connected to respective sensor outlets of the plurality of tubes, in which each of the plurality of tubes are fluid impermeable between the sampling inlet and the sensor outlet. |

Fig. 8

METHOD OF TESTING FOR LEAKS IN A CONTAINED SYSTEM

TECHNICAL FIELD

This document relates to methods of testing for leaks in a contained system.

BACKGROUND

Leak detection systems incorporate the injection of tracer fluid into a tank and the use of sensors outside the tank to detect for the presence of leaked tracer. Most detection systems require that operating fluid be first removed entirely from the tank, resulting in downtime and cost to the tank operator. Some detection systems are able to work while operating fluid is present and the tank is in operation, for example the systems disclosed in U.S. Pat. Nos. 5,767,390, and 4,709,577. However, such systems usually require a mixing device for dispersing tracer gas uniformly throughout the fluid and have lengthy response times.

Leak detection systems may incorporate permanent cable sensors along a length of a pipeline or underground tank that allow fluid diffusion along the length of the cable for detection of leaks.

SUMMARY

A method of testing for leaks in a contained system with an interior containing system gas and system liquid at an operating pressure, the method comprising: pressurizing the interior of the contained system, by introduction of gas comprising tracer gas into the interior, to at least 0.5 pounds per square inch above the operating pressure to disperse the tracer gas throughout the system liquid; and sensing for the presence of the tracer gas using one or more sensors located outside the contained system. The tracer gas should be present in the contained system at a threshold level that permits detection.

A leak detection apparatus for a contained system having an interior is also disclosed, the leak detection system comprising: a plurality of tubes each having a sampling inlet and a sensing outlet and being fluid impermeable between the sampling inlet and the sensor outlet, in which the sampling inlets of the plurality of tubes are positioned at different predetermined locations about an exterior of the contained system; and one or more sensors connected to the sensing outlets of the plurality of tubes, the one or more sensors being adapted to detect the presence of a unique fluid species indicative of a leak in the contained system.

A method of testing for leaks in a contained system with an interior containing a unique fluid species is also disclosed, the method comprising: drawing fluids such as tracer gas, into respective sampling inlets of a plurality of tubes, the sampling inlets being positioned at different predetermined locations about an exterior of the contained system; and sensing for the presence of the unique fluid species using one or more sensors connected to respective sensor outlets of the plurality of tubes, in which each of the plurality of tubes are fluid impermeable between the sampling inlet and the sensor outlet.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a side elevation view of a contained system that is being tested for leaks.

FIG. 2 is schematic of a tracer gas mixing system.

FIG. 3 is a side elevation view of different types of contained systems that the method may be used on.

FIG. 4 is a flow diagram of a method of testing for leaks in a contained system.

FIG. 5 is a side elevation view of a leak detection apparatus.

FIG. 6 is a front elevation view of a plurality of tubes dispersed about the front exterior of a contained system.

FIG. 7 is a side elevation view of a sampling inlet end of a tube.

FIG. 8 is a flow diagram of a method of testing for leaks in a contained system with an interior containing a unique fluid species.

DETAILED DESCRIPTION

Immaterial modifications may be made to the embodiments described here without departing from what is covered by the claims. The figures are not drawn to scale, and other components not mentioned may be present in order to allow the disclosed methods to be carried out.

Changing legislation, evolving technologies, environmental awareness, and aging infrastructure have all challenged companies to assess exposure to the potentially damaging environmental, public relations, and financial, risks caused by undetected leaks in petroleum storage facilities and associated piping. Thus, integrity testing of for example underground storage tank (UST) and above-ground storage tanks (AST) has become a lucrative market. Various systems and methods for leak testing of storage tanks and pipelines, often used for petroleum crude or refined-product storage and transport, have been introduced to meet this need. One method to detect leaks in these vessels and pipelines involves adding a specialty compound or mixture (called a "tracer") to the product being stored or moved that is both soluble in the product and not ordinarily present in the product or in the environment. Subsequent detection of this tracer compound or mixture outside the vessel or pipeline system can demonstrate that the tracer mixture has escaped the system, thereby indicating the system has developed a leak.

A typical tracer release detection application involves blending a tracer such as sulfur hexafluoride ($SF_6$) (a non-toxic, inert gas) with petroleum-related products in a pipeline or storage tank. Halogenated nonpolar compounds, halogenated methanes, halogenated ethanes, halogenated propanes and propenes, halogenated butanes, cyclobutanes and butenes have also been used as tracers to test fuel storage and pipeline systems. Tracer compounds have also been used to locate the underground presence and/or movement of water, soil gases, petroleum, or natural gas. Tracers have also been used to help define the presence and continuity of geologic faults and permeable formations. In each case, the specialty compound or mixture, soluble in the phase or medium of interest and not ordinarily present in the environment, is introduced at a particular location. Successful sampling for the tracer at points removed from the original release point then indicates "communication" with or "continuity" to the original release point.

Conventional tracer release detection methods to detect fuel leaks involve analyzing soil vapors drawn from sampling wells surrounding the fuel storage system for evidence of the tracer escaping the storage system. Typically, companies using tracer-related test methods locate sampling wells in the soil adjacent to fuel storage equipment. A background sample is usually taken prior to introducing the tracer compound into the fuel storage system to provide a baseline for the soil surrounding the storage tank prior to the actual tracer-related test.

After installing sampling wells and taking background tracer measurements, a technician will typically introduce one or more tracer chemicals in either gas or liquid phase into the fuel storage system. A predetermined mass of tracer(s) is inserted into the fuel storage system through a tubing line inserted into the storage tank, which is usually connected to a fitted diffuser for mixing. An alternative tracer introduction system can involve placing an enclosed gaspermeable membrane containing a given mass of tracer(s) into the storage tank and having the tracer release through the membrane over a period of time. If a storage system has a leak, the tracer may escape the storage system with the fuel.

After a predetermined time period has elapsed, a technician may use a vacuum pump attached either to the top of the sampling well, or to tubing placed into the well, to draw soil vapors through the bottom end of the sampling well into a sample container. Typically, some portion of the soil vapor sample in the container is injected into a gas chromatograph equipped with an electron capture detector (ECD) to analyze the vapor sample for the presence of the tracer. These test samples are then compared to the background samples to determine if a product leak exists.

Referring to FIG. 1, a contained system 10, such as a tank 12 below a ground level 14, is illustrated as having an interior 16. Interior 16 may contain system liquid 18 and system gas, for example in headspace 20, at an operating pressure. Tank 12 may be for example a gasoline storage tank at a petroleum service station, and may be connected through a line 21 to a gas pump 19 above ground level 14. Referring to FIG. 3, the contained system 10 may comprise one or more of a pipeline 58 or liner 60, in addition to the tank 12 illustrated in FIG. 1. Referring to FIG. 1, the system liquid 18 and system gas refer to fluids that are present in the system 10 before the method is carried out.

Referring to FIG. 4, a method of testing for leaks in a contained system is illustrated. The various stages of the method will now be described with reference to figures other than FIG. 4. As indicated, prior to the method being carried out, system 10 is at an operating pressure. The operating pressure may be at or above atmospheric pressure, and may be a normal operating pressure of the system 10 for example during operation.

Referring to FIG. 1, in a stage 100 the interior 16 of the contained system 10 is pressurized, by introduction of gas comprising tracer gas into the interior 16, to at least 0.5 pounds per square inch above the operating pressure to disperse the tracer gas above a threshold concentration throughout the system liquid 18. A threshold concentration is a concentration above which the tracer gas is sufficiently dispersed to be detectable by sensors placed outside the vessel. The threshold concentration may vary depending on the number and sensitivity of sensors 26 used in the method. Stage 100 may be carried out on tank 12 by connecting a tracer gas source 22 to a line 24 into tank 12. Line 24 may be an injection line for storage fluids, for example. If a substantial leak is located above the system liquid 18, pressurization to the desired level may not be possible or required. In a stage 102, the presence of the tracer gas is sensed using one or more sensors 26 located outside the contained system 10.

Pressurizing may comprise flushing the system gas out of the interior 16 during introduction of the gas into the interior 16. For example, a vent 28 may be used to flush out the system gas as the tracer is introduced via input line 24. By controlling the output flow of system gas through vent 28, the desired pressurization of system 10 may be maintained during flushing. For example, a controllable restrictor 29 connected to vent 28 may be used to adjust the size of the outlet (not shown) for system gas to flow through. The gas flushed out through vent 28 may be collected, for example to prevent flushed gas containing tracer gas from interfering with sensor 26 operation. Flushing allows the headspace 20 volume of system gas to be replaced with the introduced gas comprising tracer gas at the desired pressure. This allows a relatively large amount of tracer gas to be introduced even if injected at a low concentration in inert carrier gas, and also ensures that system gases such as oxygen that may negatively react with the tracer gas are expelled from the system 10.

The interior 16 may be pressurized to at least one pound per square inch above the operating pressure, and may be further pressurized in some embodiments to five or fifteen pounds per square inch above the operating pressure depending on for example the expected integrity of the vessel being tested. The increase in pressure increases the solubility of the tracer gas in the system liquid, thereby forcing the tracer gas like a plunger throughout the system liquid in a more efficient and quick manner than conventional leak detection systems. This effect is analogous to the increased dissolution of nitrogen in a diver's blood as the diver moves to lower depths underwater. As a result of the increased pressure, no mixing devices such as fritted diffusers are required to achieve fast and effective tracer gas dispersal throughout the system liquid.

The level of pressure increase may be selected by consideration of various factors. In determining the maximum pressure to apply, the pressure increase should be limited to a level below the burst pressure of the vessel. In general, burst pressure is more relevant to above-ground systems than underground systems because the pressure of backfill surrounding underground systems increases the resistance of the system to bursting. For above-ground systems, pressure may be applied incrementally, for example in 0.5 psi increments through a multi-step regulation process, in order to reduce the risk of bursting. In addition, in some embodiments a maximum of a five psi increase may be adopted to avoid a potential garden-hose situation where a large volume of system liquid is continually and uncontrollably propelled out of the system by a large backing pressure. Determining the minimum pressure increase to apply depends on consideration of pressures outside the system that may oppose leakage of system liquid. Thus, for an underground tank located below the water table, the pressure applied should be sufficient to ensure that fluid in the system is able to overcome the hydrostatic pressure of the groundwater at the base of the tank in order to allow tank fluids to leak out of the tank for detection of dissolved tracer (s). For above ground tanks, the pressure need only increase above the atmospheric pressure. For double-walled vessels, the minimum pressure increase required may be even less because the interstitial space may be under vacuum. Moreover, the amount of system liquid in the vessel may be considered in determining how much pressure increase to apply. Greater volumes of system liquid generally require greater pressures to adequately disperse the tracer gas in a given amount of time. Although pressurization has been used on empty tanks in the past, the Applicant believes that pressurization was not used in the fashion disclosed herein on systems 10 containing system liquid 18 because it would have been thought that such a large increase in pressure could result in tank rupture or an uncontrollable leakage of system liquid from the system. However, the benefits observed with the disclosed method have been found to outweigh such risks.

The methods disclosed herein allow the gas to be introduced into headspace 20 of system gas defined by the system liquid 18 and the interior 16 above the system liquid 18. In some embodiments, however, the gas may be introduced directly into the system liquid 18, for example using tracer gas source 56 and line 57. Source 56 may be located remotely, for example several kilometers away from system 10. In the field, the systems disclosed herein can achieve sufficient tracer gas dispersal in the system liquid in several minutes, even when performing the method on large tanks such as 40000 L underground storage tanks. Dispersal refers to the achievement of tracer gas concentration that is at least at a predetermined threshold concentration throughout the system liquid at which point accurate sensing may begin. Time to dispersal depends on various factors, including the height of system liquid 18, the size of headspace 20 and the pressurization of the system 10.

Referring to FIG. 2, as indicated above, the gas introduced into the interior 16 may comprise carrier gas, for example inert gas like nitrogen or argon. Argon may be desirable because gas chromatography is able to detect argon. The carrier gas may be located in a carrier gas storage unit 48, while the tracer is present in a tracer storage unit 50. Respective regulators 52 and 54 may be controlled, for example using controller 36, to combine tracer and carrier gas in the desired concentration prior to introduction into system 10. Using carrier gas allows a reduction, in the introduced gas, of the concentration of tracer gas, which is generally expensive and may be explosive at higher concentrations when in the presence of oxygen. In one embodiment the tracer gas is present in the gas at a concentration of up to 10% by volume of the introduced gas. In another embodiment tracer gas is present in the gas at up to 5% by volume of the gas. Pressurizing in stage 100 may further comprise maintaining the pressure in the interior 16 at least 0.5 pounds per square inch above the operating pressure during the sensing stage 102, for example if the gas is introduced continuously into the interior 16 throughout the sensing stage 102.

Referring to FIG. 1, because the method is designed to operate while the system liquid 18 is in the contained system 10, the method may be carried out while the contained system 10 is in operation. Thus, a pipeline operator or tank operator may have his or her contained system 10 checked for leaks with zero downtime and no lost profits. In addition, tracer gas can be rapidly flushed from the system using carrier or other gas upon completion of the method. Thus, tracer gas need not be always present in fluids stored in the contained system 10.

Referring to FIG. 1, once sufficient dispersal is reached, any fluids 30 that leak from the contained system 10 through a leak 32 will have a sufficient concentration of tracer gas for detection by the one or more sensors 26. Dotted lines are used in FIG. 1 to indicate the travel of tracer gas through the soil after exiting system 10 with leaked fluids 30. The sensing stage 102 may further comprise collecting fluids and then analyzing the fluids for the presence of tracer gas. Analysis may be carried out on site, for example by performing the analysis in a control vehicle (not shown) or within the sensor 26 itself, or remotely, for example by transporting samples collected by sensors 26 to a remote facility. Initially, the sensing stage 102 may simply be looking for the presence of any tracer gas irrespective of the exit location from the system 10. Thus, carpet probes (not shown) or other relatively imprecise sensory systems may be used. If tracer gas is detected, then a more precise detection may be carried out to pinpoint the location of leak 32. For example, an array of riser wells 34 may be positioned at sufficient distances around tank 12 using water pic installation for example. Riser wells 34 may allow sensors 26 to locate the leak 32 to within several centimeters. After the leak 32 location is confirmed, targeted excavation may proceed to uncover and repair the leak 32, if the system 10 is underground. If the system is above ground, the leak 32 may simply be repaired. Other detection systems such as IR imaging may be used to confirm the presence of the leak.

Test duration may be taken from tables of pre-calculated saturation times for the ullage and product portion of the system being tested. If using the array of riser wells 34 sampling method, test times may be <1 minute. If samples are taken directly off the surface of the cover material different test duration may be encountered and may be <5 minutes but dependant on cover material. The soil vapor samples may be collected using a vacuum pump to draw the soil vapor through the array of riser wells 34. The soil vapor may then be sent to a test vehicle (not shown) via hoses attached to each riser well 34. If sent to the test vehicle the vapor may pass through a collection manifold and then travel to an expansion chamber where an aliquot sample is analyzed for the tracers used as test agents. Because the tracers have different properties, the mixture holds the test agents against a verifying agent(s) in the same mixture. At the same time as the test is in progress the pressure is monitored and if there is no flow of the tracer in a closed system for a certain period of time such as two hours, the system is declared tight. With this method the detection of or non detection of one more tracers determines a pass or fail of the system.

In one embodiment, the method is at least partially orchestrated using a controller 36 such as a programmable logic controller. Referring to FIG. 1, controller 36 may be connected to one or more of tracer gas source 22, which may comprise tracer storage unit 50 and carrier gas storage unit 48 as shown in FIG. 2, through control line 40. Other control lines such as lines 38, 42, 46, and 44 may connect to various other components of the system as desired. In one embodiment, controller 36 may be connected to carry out the method remotely, for example at various times and dates according to a regular schedule. For example, controller 36 may be located in a shed adjacent system 10, and may automatically begin the method as instructed by a remote user or a computer program.

One or more tracer gases can be used in the method, for example one to eight tracers. Tracer gases act as quantifiable tagging agents, and may have different solubilities in the system liquid. In one embodiment at least two tracers are injected, one water soluble, and one oil soluble.

The disclosed methods provide numerous advantages. For example, the methods enable operators of system 10 to quickly produce documentation to confirm that a tank is in compliance, reduce the manpower costs required to prove tank compliance and help prevent lost revenue from regulatory enforcement. In addition, the methods may be completed without having to shut in, clean out, or adjust product levels in most tanks and associated lines. The system remains in normal service with no downtime, and with no lost revenue. Data from the test results may be used to accurately locate the leak. Previous leaks or spills have no bearing on the testing. Moreover, the methods provide precision leak detection for underground and aboveground tanks and associated piping. Tanks on skids or elevated off the ground can also be tested, for example using an ETM testing method. Complex manifolded tank systems may also be tested. Examples of applications where the disclosed methods are useful include upstream systems such as storage tanks, both above ground and below ground, midstream systems such as plants and processing facilities, pipelines of any diameter and length, covering a wide range of product, and downstream systems such as service stations, cardlocks, industrial sites, and field storage facilities. The methods may be nonintrusive and can be conducted without isolating the tank or lines. As well, a testing system for carrying out the method can be installed on most existing storage systems and can easily and inexpensively be included in new construction. A scheduled testing program can easily interface with normal facility operations.

Example tracers that may be used include Methanes including: (1) chlorobromodifluoromethane; (2) trifluoroiodomethane; (3) trifluorobromomethane; (4) dibromodifluoromethane; (5) dichlorodifluoromethane; and (6) tetrafluoromethane; B, Ethanes including: (1) dichlorotetrafluoroethane; (2) chloropentafluorethane; (3) hexafluoroethane; (4) trichlorotrifluoroethane; (5) bromopentafluoroethane; (6) dibromotetrafluoroethane; and (7) tetrachlorodifluoroethane; C. Others including: (1) sulferhexafluoride; (2) perfluorodecalin; and (3) perfluoro 1,3 dimethylcyclohexane. In addition, hydrogen, helium, $R_{134a}$, and others as disclosed herein and elsewhere may be used.

Referring to FIG. 5, a leak detection apparatus 70 for a contained system 10 having an interior 16 is illustrated. Leak detection apparatus 70 comprises a plurality of tubes 72 and one or more sensors 26. Each of the plurality of tubes 72 has a sampling inlet 74 and a sensing outlet 76. In addition, each tube 72 is fluid impermeable between the sampling inlet 74 and the sensor outlet 76. The sampling inlets 74 are positioned at different predetermined locations about an exterior 78 of the contained system 10. Thus, the sampling inlets 74 may be positioned at spacings, such as regular intervals, at varying heights and horizontal separations around the system 10 (FIGS. 5 and 6). Columns and rows of inlets 74 may be used. Arranging the inlets 74 in these manners allow the establishment of a leak detection perimeter around the system 10 that is capable of being used to ascertain the location of a leak (not shown) in the system 10 to within a precision that is on the order of the spacing between sampling inlets 74 and the capabilities of the sensory system 26. The sampling inlets 74 may be positioned substantially around the system 10, although the minimum requirement is that at least two sampling inlets 74 be provided at different locations.

Referring to FIG. 7, the tubes 72 may terminate in the sampling inlets 74 such that sampling inlets 74 form an end of each tube 72. The sampling inlet 74 may be formed by cutting the tube 72 to length. The sampling inlets 74 may comprise a screen 86. The screen 86 may be any device that is capable of restricting the entry of solids into tube 72. Screen 86 may also restrict liquid entry into tube 72, for example if screen 86 is a gas permeable frit. As shown in the illustration, an embodiment of screen 86 incorporates a plug 88 with axial passages 90 bored to allow fluid communication into tube 72.

Referring to FIG. 5, apparatus 70 may comprise one or more sensors 26 connected to the sensing outlets 76 of the plurality of tubes 72. The one or more sensors 26 may be adapted to detect the presence of a unique fluid species, such as a tracer, tracer gas, or system liquid, indicative of a leak (not shown) in the contained system 10. Each sensor outlet 76 may be connected to a separate and distinct sensor 26, or all sensor outlets 76 may be connected to the same sensor 26 for example through a manifold (not shown). A pump 84 may be provided for applying suction to the plurality of tubes 72 to draw fluids in through the sampling inlets 74. Pump 84 may be present as part of the sensor 26 system, or may be provided as a distinct component. In the embodiment shown in FIG. 5, pump 84 applies suction to sensor outlets 76 through line 77 to sensor 26.

Referring to FIGS. 5 and 6, at least a portion of the plurality of tubes 72 may be arranged together as a bundle 80. The bundle 80 may be contained at least partially within a containment tube 82. Initially, the tubes 72 may be entirely contained within the containment tube 82, for protecting tubes 72 during transport to and from a point of sale. To install the apparatus 70 the containment tube 82 may simply be cut at the desired point along the length of the tube 82, and sample inlets 74 positioned as desired. Tube 80 may also be positioned along a top of the system 10, for example as shown. Tubes 72 can then be draped along and down the sides of the tank and terminated for example by cutting at pre-determined coordinates calculated for example based on the dimensions of system 10 and the precision of detection required at each sampling inlet 74. Tube 80 protects tubes 72 from damage after and during installation. Other forms of bundling may be used such as plural ties spaced at intervals. Sampling inlets 74 may be positioned for example using brackets 92 (FIG. 6) connected to exterior 78. Other means of positioning sampling inlets 74 may be used however, such as by welding to exterior 78. Further methods include backfilling up to a pre-determined vertical height along system 10, positioning a row of sampling inlets 74 about a horizontal perimeter, and backfilling overtop of inlets 74. Plural horizontal rows of inlets 74 may be arranged in such a manner. It should be understood that sampling inlets 74 need not be positioned directly upon exterior 78, and instead sampling inlets 74 may be spaced from exterior 78. However, the closer sampling inlets 74 are to exterior 78, and the smaller the separation between adjacent sampling inlets 74, generally the higher the precision in leak detection possible with apparatus 10. In general, sampling inlets 74 should be installed in close proximity to the walls of the tank.

Various arrangements are possible, with the only requirement being that upon installation a user is able to somehow associate sensory data from sensor 26 with the location of each sampling inlet 74 about the exterior 78 of system 10. This may require making an association between each sampling inlet 74 and corresponding sensor outlet 76. For this purpose, tubes 72 may be color-coded or marked such as with numbering in some fashion to allow a user to make the required association. Sampling inlets 74 may also contain electronics for transmitting location signals that may be detected and used to record 3D positioning. Such information may then be used to accurately plot a 3D model of the location of each sampling inlet 74 about a contained system 10. System 10 may be above or below ground.

In some embodiments, a controller 36 may be used. For example the sensors 26 may be adapted to produce an output signal, and controller 36 may be connected for example through line 46 to receive as input the output signal from the one or more sensors 26. Controller 36 may be further connected to operate a tracer introduction system, such as the introduction systems disclosed elsewhere in this document. Controller 36 may also be connected to other components in the apparatus 70, such as pump 84 through line 91.

Referring to FIG. 8, a method of testing for leaks in a contained system 10 with an interior 16 containing a unique fluid species such as tracer is illustrated. The method stages will now be described with reference to the other figures. In a stage 104, fluids are drawn into respective sampling inlets 74 of a plurality of tubes 72 (FIG. 5). The sampling inlets 74 are positioned at different predetermined locations about an exterior 78 of the contained system 10. In a stage 106, the presence of the unique fluid species is sensed for using one or more sensors 26 connected to respective sensor outlets 76 of the plurality of tubes 72. Each of the plurality of tubes 72 are fluid impermeable between the sampling inlet 74 and the sensor outlet 76. As mentioned, the unique fluid species may be tracer gas. The method may further comprise introducing tracer gas into the interior 16, for example using the methods disclosed elsewhere in this document.

The methods disclosed herein may further comprise determining the location of a leak (not shown) in the contained system 10 based upon signals from the one or more sensors 26. Thus, controller 36 in FIG. 5 may receive sensory data from sensor 26 and may perform an association between each particular fluid sample analyzed and the corresponding location on exterior 78. By analyzing the intensity and presence of signals indicative of the presence of a tracer or unique fluid species, the location of the leak can be mapped out and inferred. A leak may cause detection at more than one sampling inlet 74, so detection intensities at different points may need to be compared to determine the most likely candidate for location of the leak.

The embodiments described above and illustrated in FIGS. 5-8 may be used for new installations. These embodiments may eliminate a need to bore holes in the tank cover material after construction is completed. In addition, after installation, controller 36 and sensor 26 may be conveniently located above ground a sufficient distance away, for example in an accessible terminal box (not shown).

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiment of the invention in which an exclusive property or privilege is claimed are defined as follows:

1. A method of testing for leaks in a contained system, the method comprising:

pressurizing an interior of the contained system, wherein the interior contains system gas and system liquid at an operating pressure, the system liquid and the interior defining a headspace of system gas above the system liquid, wherein pressurizing the interior includes introducing gas comprising tracer gas directly into the headspace, in which the tracer gas is soluble in the system liquid, to at least 0.5 pounds per square inch above the operating pressure to disperse the tracer gas throughout the system liquid; and sensing for the presence of the tracer gas using one or more sensors located outside the contained system to detect tracer gas that has escaped the contained system and traveled from the contained system to the one or more sensors.

2. The method of claim 1 in which pressurizing further comprises flushing the system gas out of the interior during introduction of the gas into the interior.

3. The method of claim 1 in which the gas comprises carrier gas.

4. The method of claim 3 in which the carrier gas is inert.

5. The method of claim 3 in which the tracer gas is present in the gas at a concentration of up to 10% by volume of the gas.

6. The method of claim 1 in which the method is carried out while the contained system is in operation.

7. The method of claim 1 in which the interior is pressurized to at least 1 pound per square inch above the operating pressure.

8. The method of claim 7 in which the interior is pressurized to at most 5 pounds per square inch above the operating pressure.

9. The method of claim 1 which the interior is pressurized to at most 15 pounds per square inch above the operating pressure.

10. The method of claim 1 in which the contained system comprises one or more of a pipeline, a tank, or a liner.

11. The method of claim 1 in which the contained system is underground.

12. The method of claim 1 in which pressurizing further comprises maintaining the pressure in the interior at least 0.5 pounds per square inch above the operating pressure during sensing for the presence of the tracer gas.

13. The method of claim 12 in which pressurizing further comprises continuously introducing the gas into the interior throughout sensing for the presence of the tracer gas.

14. The method of claim 1 in which the one or more sensors comprise an array of riser wells.

* * * * *